United States Patent [19]

Uchida et al.

[11] 4,329,636
[45] May 11, 1982

[54] ROTATION SENSOR DEVICE

[75] Inventors: Ryohei Uchida; Tatsuo Yamasaki; Munehiko Mimura; Kōsuke Hasimoto; Sadanobu Kawabe, all of Amagasaki, Japan

[73] Assignee: Mitsubishi Denki Kabushiki Kaisha, Tokyo, Japan

[21] Appl. No.: 60,058

[22] Filed: Jul. 24, 1979

[30] Foreign Application Priority Data

Jul. 25, 1978 [JP] Japan ................................ 53/91057

[51] Int. Cl.³ .......................................... H02K 29/00
[52] U.S. Cl. .................................... 318/721; 318/723; 318/254; 318/653; 310/68 R; 310/68 A; 310/268
[58] Field of Search ................... 310/68 R, 268, 68 A, 310/156; 318/138, 254, 254 A, 721, 723, 653

[56] References Cited

U.S. PATENT DOCUMENTS

| | | | |
|---|---|---|---|
| 3,911,339 | 10/1975 | Rettig | 318/721 X |
| 3,988,654 | 10/1976 | Takahashi et al. | 318/254 A |
| 4,093,897 | 6/1970 | Fujita et al. | 310/268 |
| 4,109,170 | 8/1970 | Fujita et al. | 310/68 R |
| 4,125,796 | 11/1978 | Nagase et al. | 318/721 |
| 4,135,120 | 1/1979 | Hoshimi et al. | 318/721 X |
| 4,220,879 | 9/1980 | Hoshimi et al. | 310/68 R |
| 4,260,920 | 4/1981 | Nakamura et al. | 310/68 R X |

Primary Examiner—Donovan F. Duggan
Attorney, Agent, or Firm—Wenderoth, Lind & Ponack

[57] ABSTRACT

A plurality of slots are disposed at equal angular intervals on one portion of a circular ring-shaped field magnet fixed to a motor's rotor to run radially of the magnet. Alternatively, short rods made of a soft magnetic material may extend radially outwards from the lateral surface of the magnet to form the slots between them. Three magnetic sensor elements are disposed at equal angular intervals of 120 degrees on a motor's stator to face successively the slots during the rotation of the rotor.

12 Claims, 27 Drawing Figures

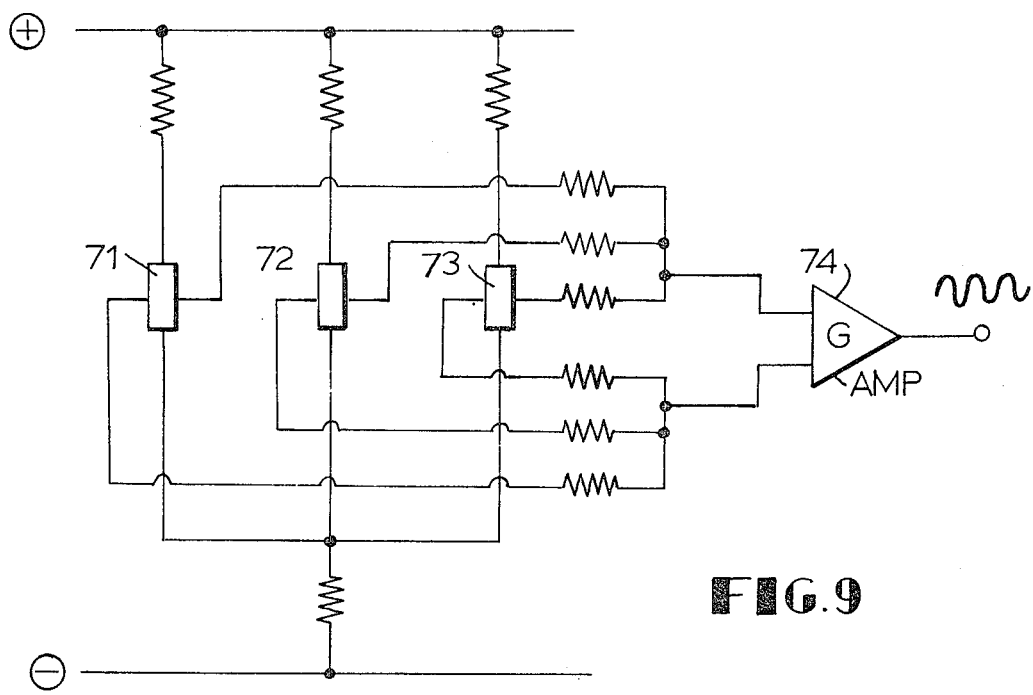
FIG.9
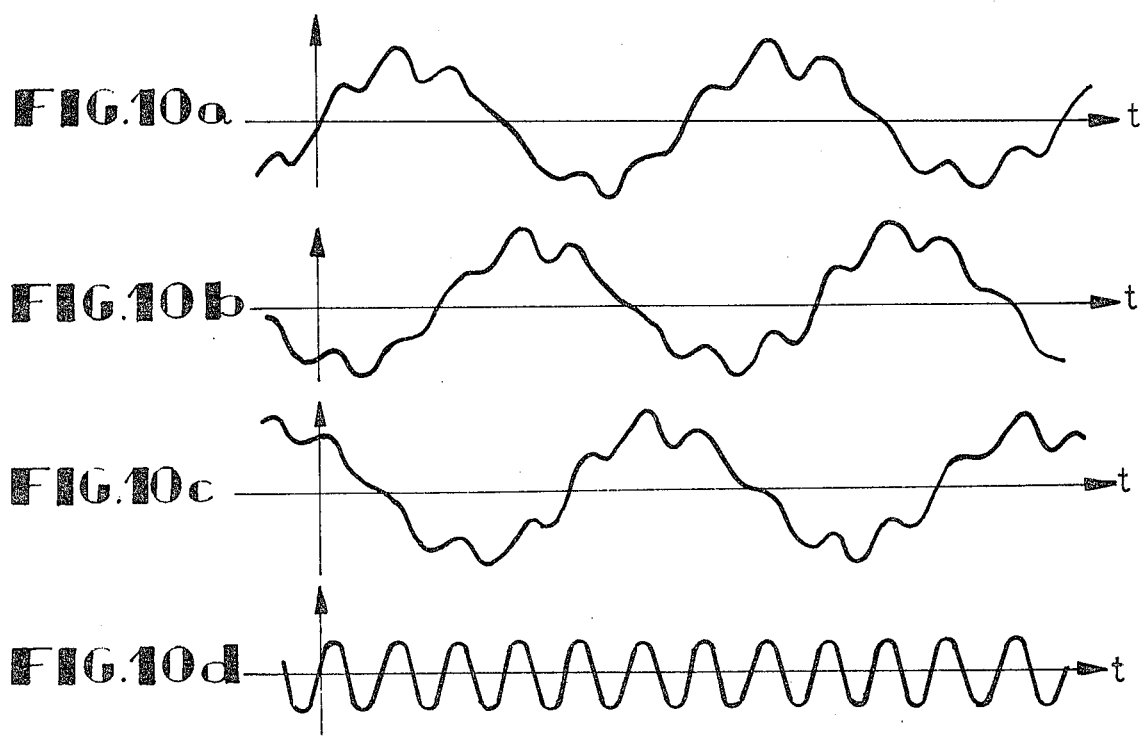
FIG.10a
FIG.10b
FIG.10c
FIG.10d

ROTATION SENSOR DEVICE

BACKGROUND OF THE INVENTION

This invention relates to a rotation sensor device for sensing the angle of rotation and/or a speed of rotation of an electric motor, and more particularly to improvements in a magnetic rotation sensor device utilizing a change in magnetic flux density or reluctance.

Thyristor motors and transistor motors well known as self-controlled synchronous motors generally require a rotation sensor device in order to sense the angular position thereof, which is required for controlling the conduction of thyristors and transistors involved, and the rotational speed thereof, which is required for controlling the rotational speed thereof.

In conventional self-controlled synchronous motors supplied from a variable current source through an associated inverter bridge, the speed sensor such as a tachometer generator or a pulse encoder senses the actual motor-speed signal which is, in turn, compared with a reference motor-speed signal to generate a reference current signal. Then the variable current source controls the sensed actual current supplied to the inverter bridge so it is equal to the reference current signal.

On the other hand, the position sensor senses the actual position signal of the rotating motor and an associated phase control circuit responds to the actual position signal to control the conduction of thyristors or thyristors disposed in the inverter bridge.

Conventional rotation sensor devices such as the speed and position sensors as described above have included a source of light or of magneto-motive force and/or a signal converter circuit for shaping waveforms and so on. Therefore they have had limitations on the external dimensions making it difficult to make them small-sized. As a result, upon installing such a rotation sensor device on an electric motor and particularly on a small-sized electric motor, the resulting motor has been disadvantageous in that its dimensions when it includes a rotational force generation mechanism become large.

Accordingly, it is an object of the present invention to provide a new and improved rotation sensor device which can be made small-sized by using the motor field as a source of magneto-motive force and constructing both a position sensor and a speed sensor in a unitary structure, so that the electric motor provided with the rotation sensor device can be small-sized and yet easy to machine and assemble.

SUMMARY OF THE INVENTION

The present invention provides a rotation sensor device comprising an electric motor including a rotor, field means having a plurality of magnetic poles disposed thereon and fixedly secured to the rotor, stator, and at least one armature coil disposed on the stator; speed signal forming means for forming alternately and repeatedly an increase and a decrease in magnetic flux density due to the field means circumferentially of the rotor in the direction of rotation of the rotor with a pitch shorter than the pole pitch of the field means; a magnetic sensor element for sensing the amount of magnetic flux formed by the speed signal forming means and producing a corresponding output; and a control circuit for separating a position signal and a speed signal from the output from the magnetic sensor element and separately sensing the position signal and the speed signal.

Preferably, the speed signal forming means includes a plurality of slots disposed on one portion of the field means circumferentially of the rotor in the direction of rotation of the rotor.

BRIEF DESCRIPTION OF THE DRAWINGS

The present invention will become more readily apparent from the following detailed description taken in conjunction with the accompanying drawings in which:

FIG. 9 is a diagram of a control circuit for taking out a velocity signal from the arrangement shown in FIGS. 8A, 8B and 8C;

FIG. 10a–10d is a graph illustrating waveforms developed at various points in the arrangement shown in FIG. 9;

Throughout the Figures like reference numerals designate the identical or corresponding components.

DESCRIPTION OF THE PREFERRED EMBODIMENTS

Figure 1:
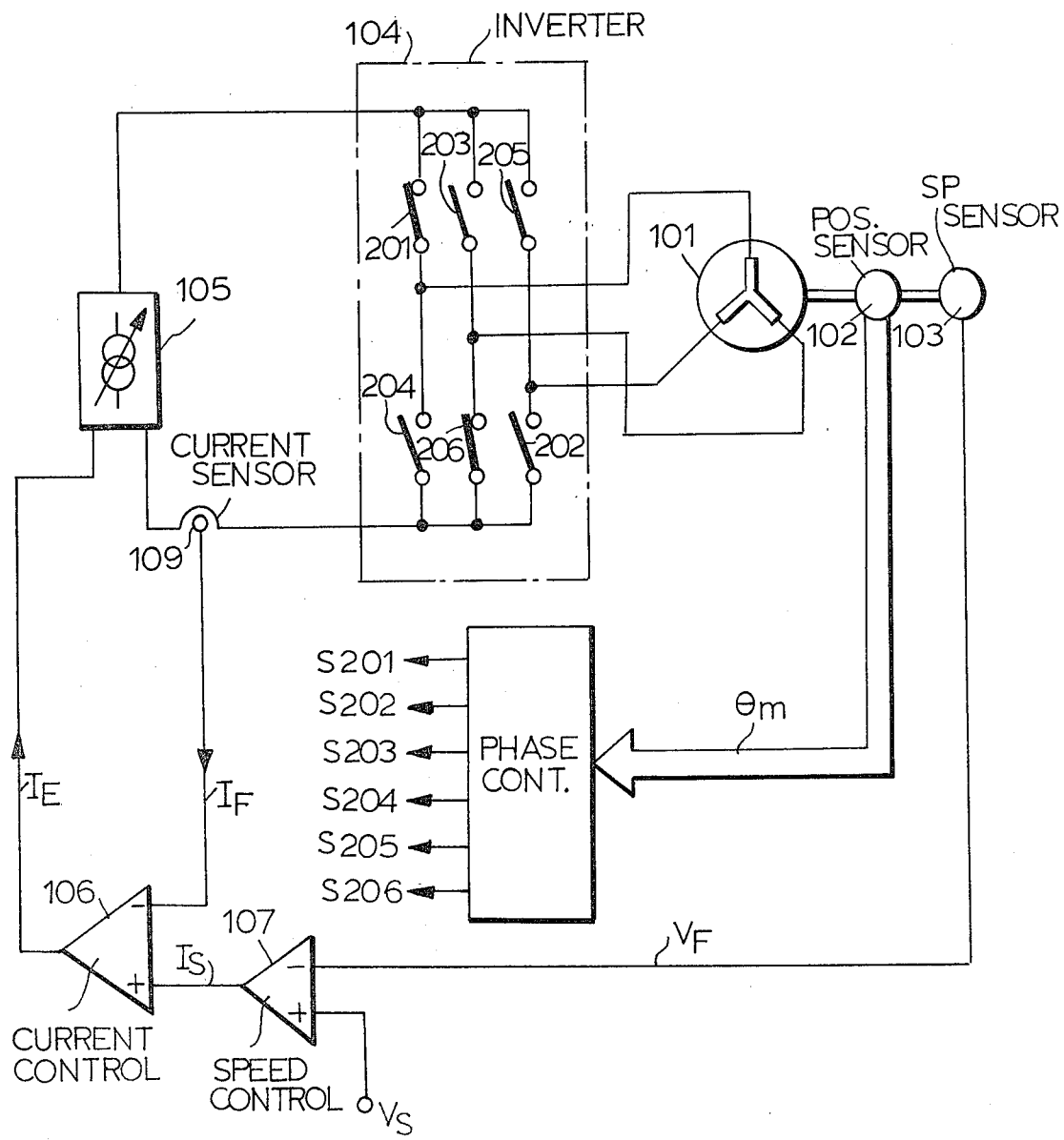
FIG. 1 is a combined circuit and block diagram of the fundamental configuration of a conventional self-controlled synchronous motor.

Referring now to FIG. 1 of the drawings, there is illustrated the fundamental circuit configuration of a self-controlled three-phase synchronous motor well known in the art. The arrangement illustrated comprises a three-phase synchronous motor 101 including a three-phase armature winding, a position sensor 102 and a speed sensor 103 mechanically connected to the motor 101, and a three-phase inverter bridge 104 electrically connected to the three-phase armature winding of the synchronous motor 101 and supplied from a variable current source 105 capable of controlling the power supply to the synchronous motor 101. The three-phase inverter bridge 104 is shown as including one pair of series connected switches 201 and 204, 203 and 206 or 205 and 202 for each phase. Each switch is a semiconductor element such as a transistor or a thyristor. The speed sensor 103 is connected to a current control circuit 106 through a speed control circuit 107. The position sensor 102 is connected to a phase control circuit 108 and the current control circuit 106 is connected to the variable current source 105. Also a current sensor 109 is connected between the variable current source 105 and the inverter bridge 104 to sense the actual current supplied to the latter.

The speed control circuit 107 receives the actual speed signal $V_F$ from the speed sensor 103 and a reference speed signal $V_S$ externally generated to produce a reference current signal $I_S$ which is the difference between the two signals. The reference current signal $I_S$ is applied to the current control circuit 106 with the actual current $I_E$ sensed by the current sensor 109 to produce a difference current signal $I_E$ between the two signals. The variable current source 105 is responsive to that difference current signal $I_E$ to control its output current or the actual current $I_F$ so that it is equal to the reference current signal $I_S$.

In the current control as described above, the input direct current to the inverter bridge 104 is controlled but the current supplied to the synchronous motor 101 is not controlled. However, the control of the input direct current is equivalent to the control of a motor current in view of the relation between the same and the phase control of the power supply to the inverter bridge 104 as will be described in more detail.

The speed sensor 103 comprises, in many cases, a tachometer generator and a pulse encoder. In general, a tachometer generator used with the speed control has an accuracy which is required to be quite high while a pulse encoder having a simple construction is used with the speed control the accuracy of which is not required to be so high. It is to be understood that pulse encoders can have a high accuracy for the speed control by increasing the number of pulses per each complete rotation of the electric motor.

On the other hand, the phase control circuit 108 is responsive to the actual position signal $\theta m$ from the position sensor 102 and delivers conduction phase signals $S_{201}$ through $S_{206}$ for controlling the switches 201 through 206 respectively. Those conduction phase signals $S_{201}$ through $S_{206}$ are determined by the phase relations of a speed electro-motive force induced across the synchronous motor 101 and which vary in accordance with the forward, reverse, running or regenerative mode of operation.

In general, the switches in the inverters have, in many cases, a conduction time period of conduction per each repetition period equal to one third the period and are called 120° conduction type switches. In this case, the control of the input direct current to inverters is by itself, equivalent to the control of the associated motor current.

Also the position sensor 102 is in many cases, formed of either an approach switch or a pulse encoder.

Rotation sensor devices such as the speed sensor or the position sensor as described above may be the photoelectric type or the magnetic type and include a source of light, a source of magneto-motive force or a signal converter circuit having, for example, a waveform shaper in view of the theoretical structure. Therefore, when making those rotation sensor devices small-sized, there are limitations as to the reduction of the external dimensions. As a result, the installation of the rotation sensor device on the electric motors and particularly small-sized electric motors has been disadvantageous in that the resulting size including the rotational force-generating mechanism is large.

Figure 2A:
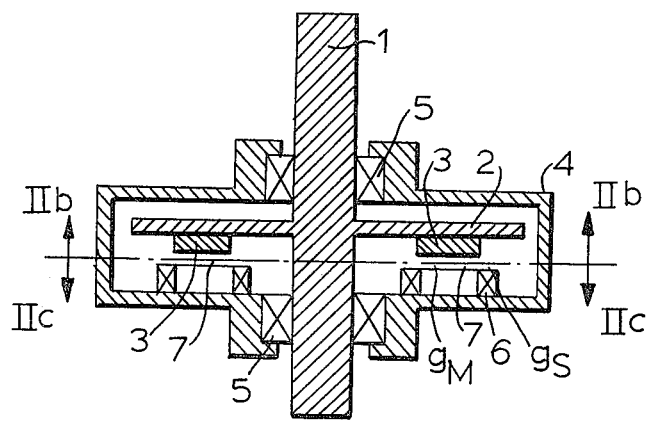
FIG. 2A is an axial sectional view of one embodiment of the rotation sensor apparatus according to the present invention.
Figure 2B:
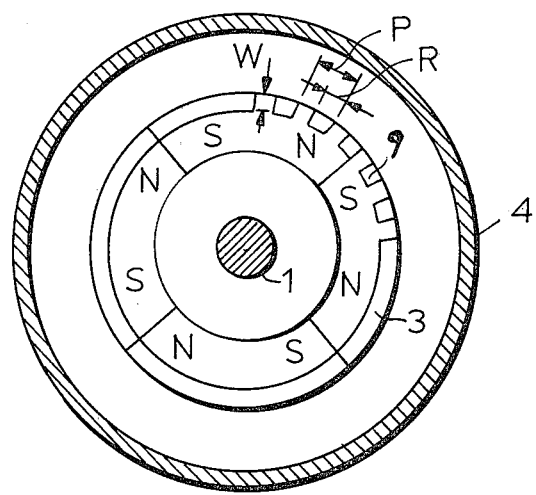
FIG. 2B is a radial sectional view of the arrangement shown in FIG. 2A taken along the line IIB—IIB of FIG. 2A and viewed in the direction of the arrows in FIG. 2A.
Figure 2C:
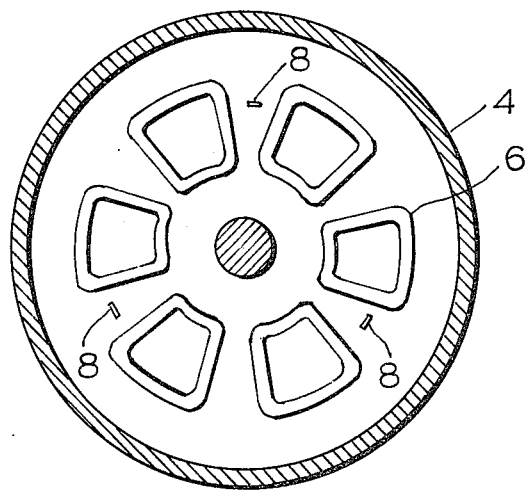
FIG. 2C is a view similar to FIG. 2B but illustrating the arrangement of FIG. 2A taken along the line IIC—IIC of FIG. 2A and viewed in the direction of the arrows in FIG. 2A.

Referring now to FIGS. 2A, 2B and 2C, there is illustrated a three-phase-eight pole synchronous motor including a rotation sensor according to the present invention. The arrangement illustrated comprises a rotor shaft 1, a disc-phased rotor 2 mounted on the rotor shaft 1, an annular field magnet 3 fixed to one side, in this case, the lower side as viewed in FIG. 2A of the rotor 3 so as to be coaxial with the latter, and a stator 4 formed of a pair of similar circular annuli disposed in parallel spaced relationship with the field magnet 3 on the rotor 2 therebetween and an axial wall interconnecting outer peripheries of both annuli. A pair of bearings 15 are fixed in the central openings of the stator 4 and have the rotor shaft rotatably extending therethrough. A plurality of armature coils 6, in this case six coils, are disposed at equal angular intervals on that annulus opposite to the field magnet 3 and coaxial with the rotor shaft and located directly below and somewhat spaced from the field magnet 3 to form therebetween an air gap 7 serving as a magnetic path. Also a plurality of magnetic sensor elements 8, in this case three elements, are disposed at equal angular intervals on the annulus with the armature coils 6 and located between the adjacent armature coils 7 with two armature coils 6 disposed between each pair of the magnetic sensor elements 8.

As shown in FIG. 2B, the field magnet 3 includes a plurality of N magnetic poles alternating S magnetic poles with each pole spaced from the adjacent poles by a predetermined angular intervals, in this case, equal to a mechanical angle of 45 degrees. Further the field magnet 3 is partly machined so as to be recessed so that a plurality of slots 9 are disposed at equal angular intervals on a predetermined portion of an outer peripheral edge thereof to form means for forming a spaced signal for the rotor 2 (see FIG. 2B). As shown in FIG. 2B the slot 9 has a radial width W, a circumferential width R and a slot pitch P. In the example illustrated the radial width W is of a mechanical angle of 7.5 degrees, and the slot pitch P is a mechanical angle of 15 degrees. It is seen that the slot pitch is smaller than the interpolar angular interval or the pole pitch of the field magnet 3.

The slots 9 form speed signal forming means as will be apparent hereinafter.

Figure 3:
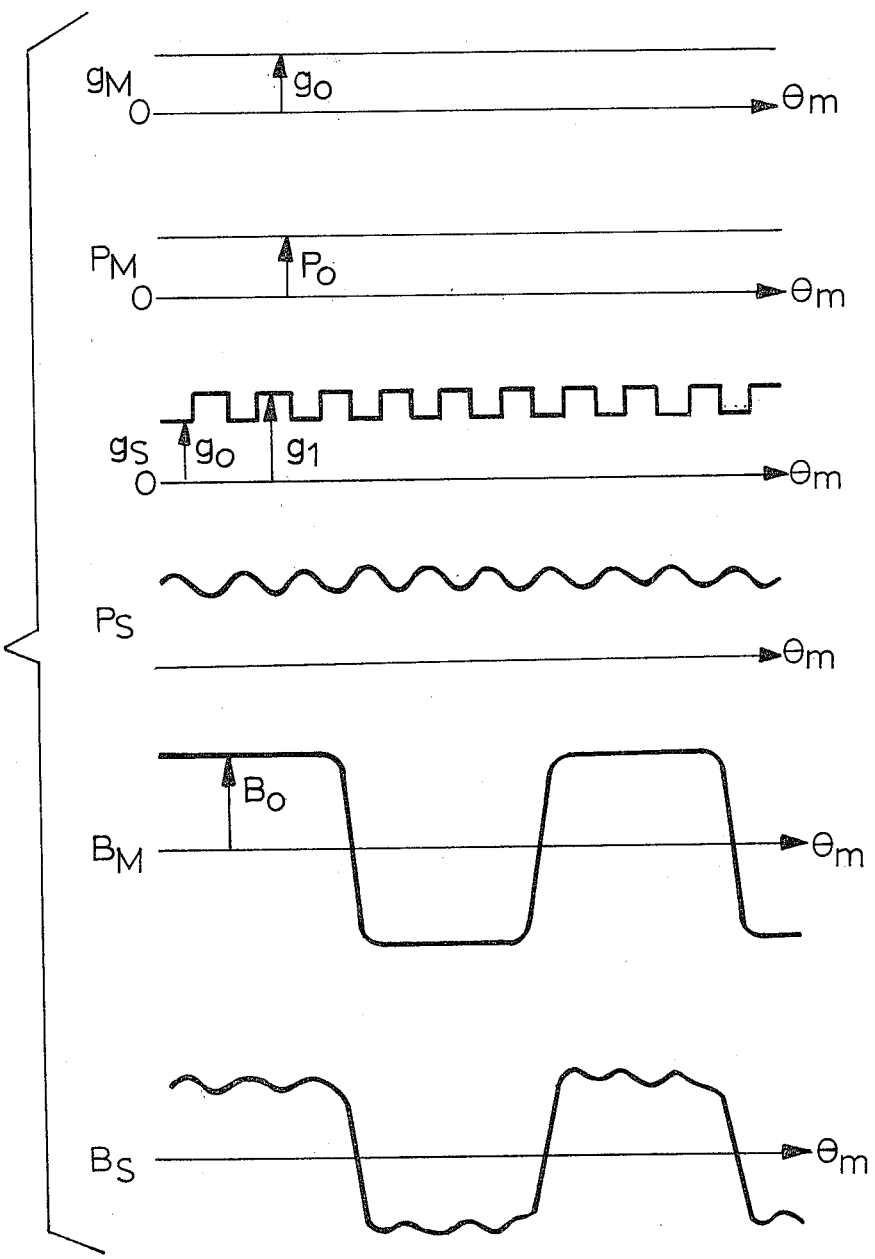
FIG. 3 is a diagram of waveforms in the air gap shown in FIG. 2A.

Regarding the air gap 7, it is assumed that $g_0$ designates the gap length between that portion of the surface of the field magnet 3 having no slot and that surface of the armature coils 6 exposed to the gap 7 and $g_1$ designates the gap length between that portion of the surface of the field magnet 3 having slots and that surface of the armature coils 6 exposed to the gap 7. Under the assumed condition, a field distribution contributing to the drive of the motor includes a component as determined by the main gap $g_M$ having the gap length $g_0$ that is uniform and a component as determined by a sensing gap $g_S$ having the gap length $g_0$ alternating with the gap length $g_1$ because the sensing gap $g_S$ contacts that portion of the surface of the field magnet 3. Waveforms (a) and (c) in FIG. 3 show respectively the gaps $g_M$ and $g_S$ developed in the direction of the rotational angle $\theta m$ of the rotor 2. Assuming that the field magnet 3 produces a magneto-motive force circumferentially distributed which is substantially square for each magnetic pole, the distribution of magnetic permeances $P_M$ due to the main gap $g_M$ for each infinitesimal unit area of that gap is substantially as shown by waveform (b) in FIG. 3. That is, it has a constant value $P_0$. On the other hand, the distribution of magnetic permeances $P_S$ due to the sensing gap $g_S$ for each infinitesimal unit area of that gap is substantially as shown by waveform (d) in FIG. 3. Namely, it is pulsating.

As shown by waveform (e) in FIG. 3, the magnetic flux density $B_M$ within the main gap $g_M$ has a substantially constant value $B_0$ but it is alternately inverted in polarity as it moves circumferentially of the field magnet 3 or in the direction of the rotational angle $\theta m$. Also the magnetic flux density $B_S$ within the sensing gap $g_S$ is substantially similar to that within the main gap except that the flat portion thereof is pulsating due to the influence of the slots 9, as shown by waveform (f) in FIG. 3.

The magnetic sensor elements 8 schematically shown in FIG. 2C are installed on those portions of the stator 4 exposed to the sensing gap $g_S$ so as to sense the magnetic flux density $B_S$ within the gap $g_S$. The magnetic sensor element can comprise, for example, a Hall effect element, a reluctance effect element or the like and is operative to produce an electrical signal such as a change in voltage, current or impedance dependent upon the sensed magnetic flux density. In other words, as the rotor 2 is rotated, each of the magnetic sensor elements 8 senses the magnetic flux density $B_S$ within the sensing gap having the characteristics that the magnetic flux density alternately increases and decreases in the direction of rotation of the rotor 2 and/or the polarity is inverted due to the field magnet 3.

Positions where the magnetic sensor elements are disposed on the stator 4 may be determined in accordance with the circuit configuration of an associated phase control circuit, the phase control system involved, the number of magnetic poles and phases of a mating electric motor etc. This forms no part of the present invention and therefore will not be described further in detail. The area over which the magnetic sensor element senses the magnetic flux density within the sensing gap is infinitesimal as described above and preferably smaller than the area defined by the circumferential dimension R and the radial width W of the slot.

Figure 4:
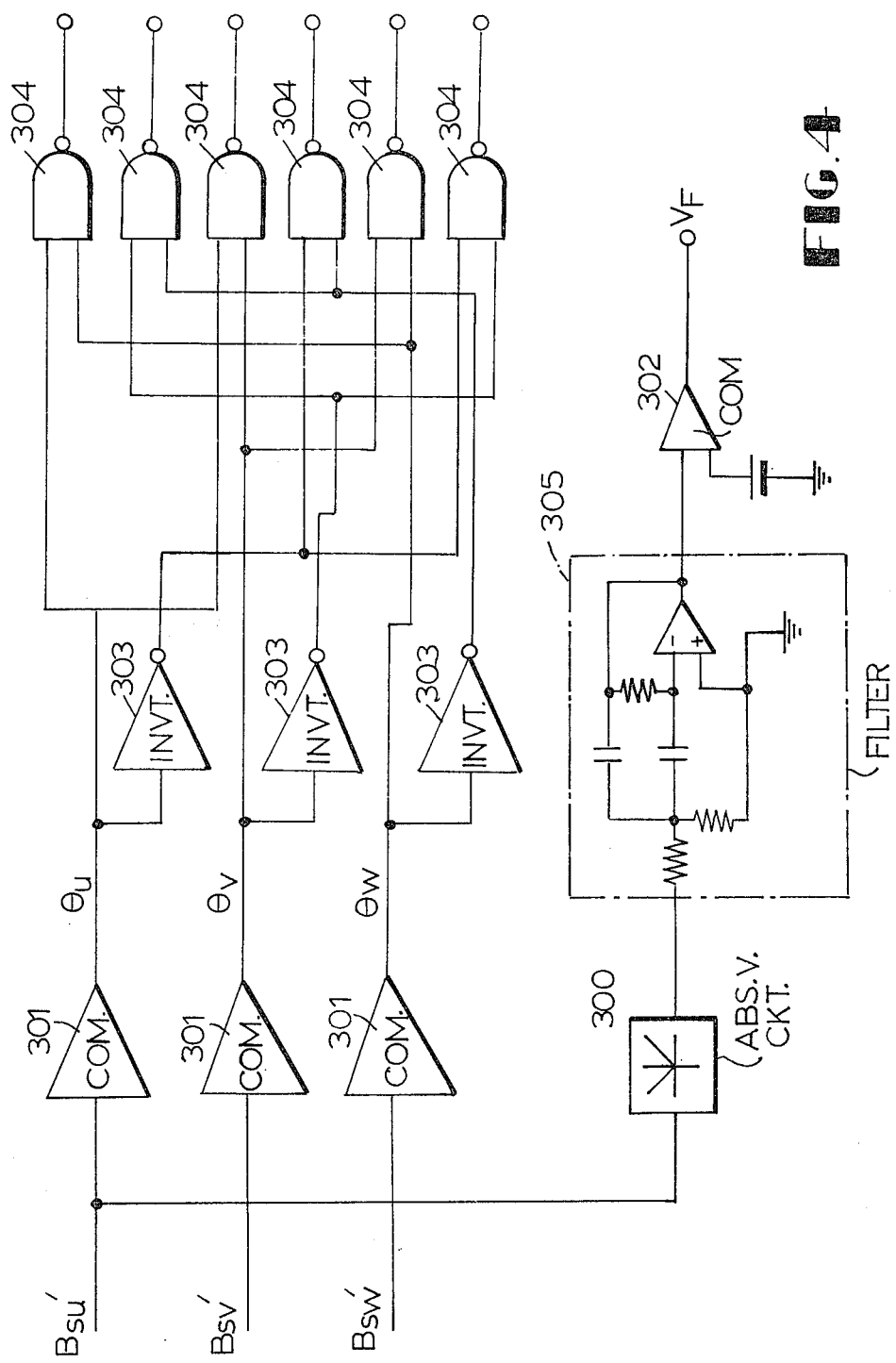
FIG. 4 is a connection diagram of a combined phase control and signal converter circuit which can be used with the present invention.

Since the magnetic sensor device senses the magnetic flux density so as to produce a sensed signal that is very low, the same is connected to a signal converter circuit for amplifying the sensed signal and shaping a waveform therefrom. FIG. 4 shows, by way of example, a combined phase control and signal converter circuit. The arrangement illustrated comprises an absolute value circuit 300, three comparators 301, connected directly and via respective inverters 303 to six NAND gates 304 in the manner as shown in FIG. 4 and a filter 305 connected between the absolute value circuit 300 and another comparator 302. The comparators 301, the absolute value circuit 300, the filter 305 and the comparator 302 form a signal converter circuit while the inverter 303 and the NAND gates 304 form a phase control circuit.

Figure 5A:
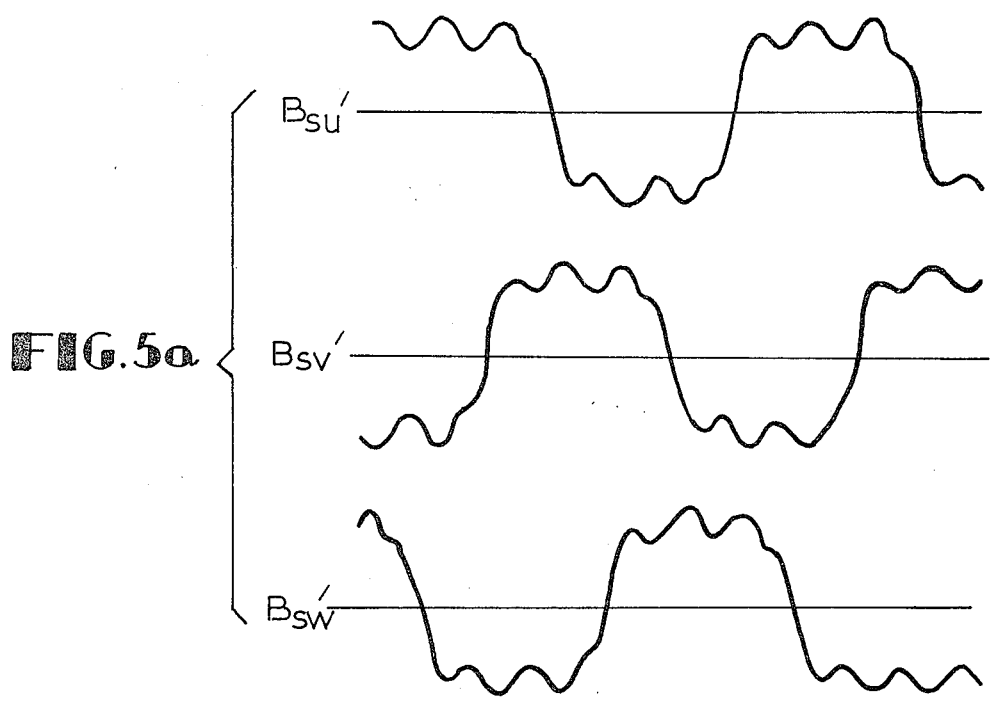
FIGS. 5a–5d are diagrams of waveforms developed at various points in the arrangement shown in FIG. 4.
Figure 5B:
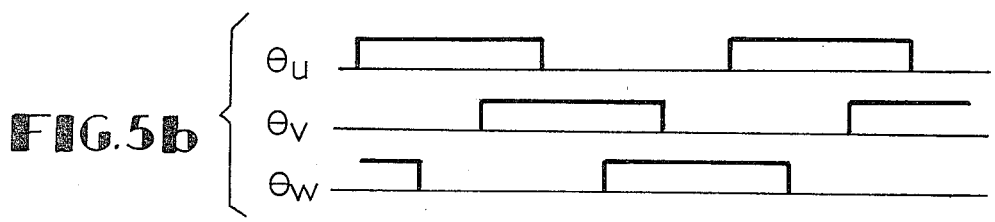

The operation of the arrangement shown in FIG. 4 will now be described in conjunction with FIG. 5. In FIG. 5a the three waveforms show respectively the magnetic flux densities $B_{SU}$, $B_{SV}$ and $B_{SW}$ sensed by the three magnetic sensor elements 8 (see FIG. 2C) as the rotor 2 is rotated. Assuming that the magnetic sensor elements produce voltages proportional the sensed magnetic flux densities $B_{SU}$, $B_{SV}$ and $B_{SW}$ respectively, those voltages designated by $B_{SU}'$, $B_{SV}'$ and $B_{SW}'$ are applied to the respective comparator 301 where the polarity thereof is determined. Thus the comparators 301 produce respective fundamental wave signals $\theta_U$, $\theta_V$ and $\theta_W$ in the form of rectangular pulses as shown by waveforms $\theta_U$, $\theta_V$ and $\theta_W$ in FIG. 5b.

Figure 5C:
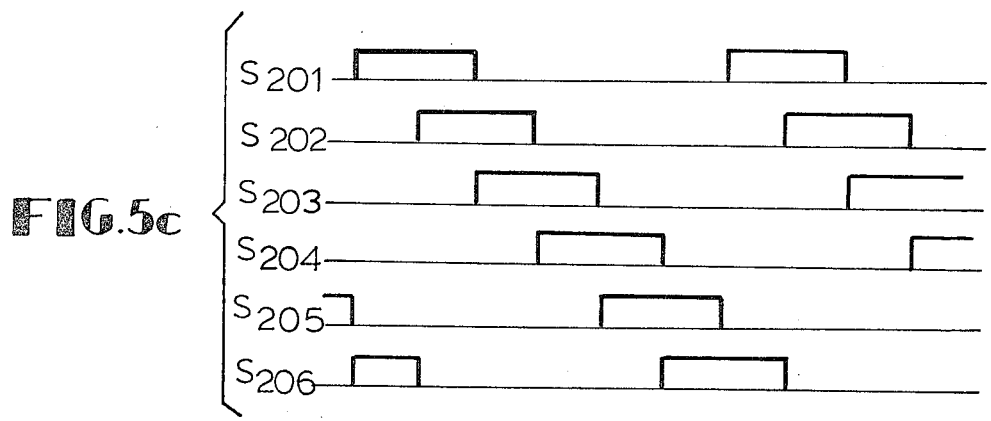

The fundamental wave signals $\theta_U$, $\theta_V$ and $\theta_W$ are applied to the inverters 303 respectively and the NAND gates 304 deliver respective conduction phase signals S201, S202, S203, S204, S205 and S206 as shown by waveforms S201, S202, S203, S204, S205 and S206 in FIG. 5c respectively.

On the other hand, the voltage $B_{SU}'$ from the magnetic sensor element 8 for the U-phase is applied to the absolute value circuit 300 to be converted to a signal representing the absolute value. This absolute value signal passes through the filter 305 and then the comparator 302. The comparator 302 compares the signal passed through the filter 305 with a reference signal from a reference source connected thereto to determine the level of the signal from the filter 305 thereby to deliver a train of pulses $V_F$ as shown by the waveform $V_F$ in FIG. 5d. The pulse train $V_F$ has a pulse repetition frequency proportional to the number of rotations of the motor in a unit period of time.

Figure 5D:
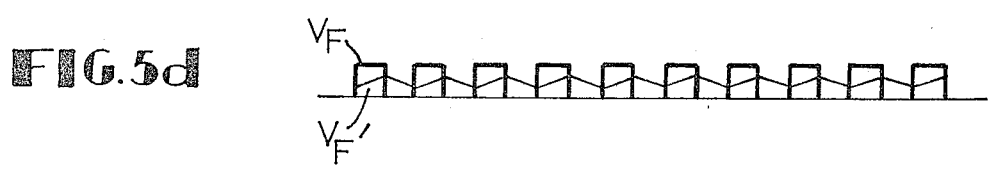

The pulse train $V_F$ is applied to a filter where it is converted to an analog speed signal $V_F'$ such as shown by waveform $V_F'$ in FIG. 5d.

It will readily be understood that the speed sensing accuracy can be raised by increasing the number of slots for each complete rotation of the motor.

In the arrangement shown in FIG. 2 the rotation sensor device is disposed on the main body of the motor thereby to eliminate the necessity of additionally providing a rotation sensor device outside of the motor. This results in a small-sized motor. Particularly the utilization of the magneto-motive force resulting from the field magnet is effective for preventing the structure and dimension of electric motors from becoming large.

Also the magnetic flux density for each magnetic pole is uniform in the main gap and the magnetic permeance for each magnetic pole is also uniform in the sensing gap. This results in few problems causing an imbalanced torque due to an unbalanced magnetic flux and the like.

While a square slot has been described it is to be understood that the slot may be corrugated or triangular. It is required only to distribute the magnetic permeance of concerning the sensing gap to vary circumferentially and periodically.

The principles of the rotation sensor device as described above are equally applicable to multipole multiphase synchronous motors and it is also possible to apply them to linear motors, in addition to disc type motors.

Further the present invention is equally applicable to electric motors having a field produced by a magnetic core and the field winding. In the later case, the sensing gap is located in the path along which the field magnetic flux flows.

In the arrangement of FIG. 2 the field magnet has been mechanically provided on the end surface with a plurality of concave and convex portions serving to vary periodically the density of the magnetic flux flowing through the magnetic sensor element. However, this periodic variation in magnetic flux density may be magnetically accomplished. More specifically, the particular magnetic charging device may be modified by cutting a plurality of recesses or concave portions in a predetermined pattern in that portion of the yoke abutting the field magnet, thereby prevent the recesses in the yoke from contacting the magnet. This results in a decrease in magnet flux density in that portion of the field magnet facing each of the recesses on the yoke. That is, the recesses or slots are able to be magnetically formed in the field magnet.

Figure 6A:
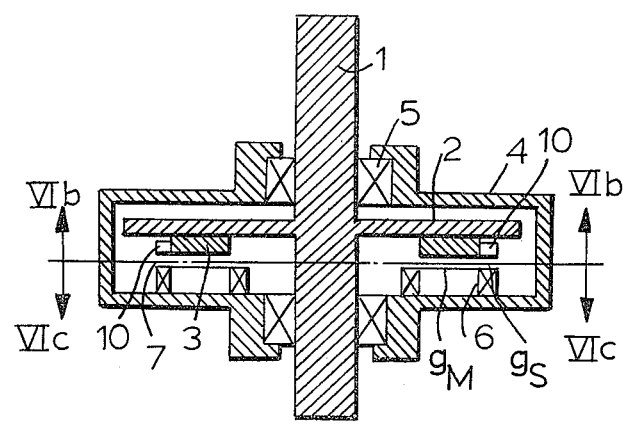
FIGS. 6A, 6B and 6C are views similar to FIG. 2A, 2B and 2C respectively but illustrating a modification of the present invention.
Figure 6B:
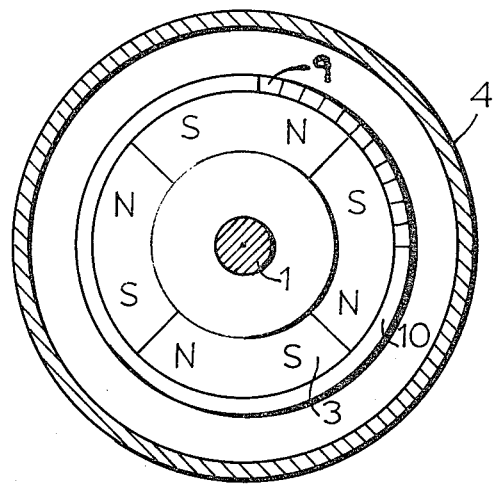
Figure 6C:
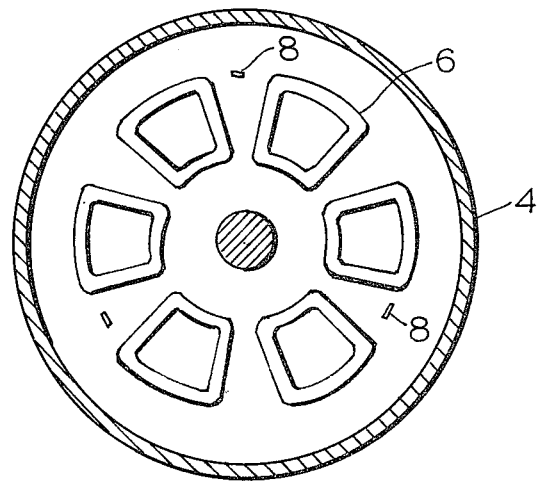

A modification of the present invention is illustrated in FIGS. 6A, 6B and 6C wherein like reference numerals designate the components identical or corresponding to those shown in FIGS. 2A, 2B and 2C. The arrangement illustrated is different from that shown in FIG. 2 only in that in FIG. 6 the slots 9 are formed on the outer peripheral surface of the field magnet 3 by attaching a soft magnetic material thereto. More specifically by machining a soft magnetic strip 10 having a predetermined thickness, a plurality of slots 9 are formed over a predetermined length of the strip 10 and direction of the thickness thereof as described above in conjunction with FIG. 2B. Then the strip 10 thus machined is attached to the outer peripheral surface of the field magnet 3 throughout its entire length such as by an attaching machine. The strip 10 has one edge, in this case, the lower edge as viewed in FIG. 6A substantially flush with the lower end surface of the field magnet 3 and the slots 9 run radially outward as shown in FIG. 6B.

In the arrangement shown in FIG. 6, the magnetic permeance is distributed in the direction of rotation of the motor so as to vary periodically within the sensing gap $g_s$ located radially outside of the field magnet 3. Accordingly, the magnetic sensor elements 8 are disposed on th stator 4 so as to be radially spaced further from the longitudinal axis of the rotor shaft 1 than those shown in FIG. 2C so as to face the sensing gap $g_s$ as will readily be understood from a comparison of FIG. 6C with FIG. 2C.

While in the arrangement at FIG. 2, it may be generally difficult to machine the field magnet 3 to form the slots 9 thereon, the machining and assembling is simplified in the arrangement of FIG. 6 because the slotted strip 10 can be separately prepared and attached to the field magnet 3.

If desired, the strip 10 may be formed into a circular annulus of a nonmagnetic material such as a plastic material or the like which annulus has an inside diameter sufficient to permit the annulus to be rigidly fitted onto the field magnet 3. After the annulus has been rigidly fitted onto the field magnet 3, a plurality of magnetic members similar to protrusions shown in FIG. 6B are inserted into that portion of the annulus corresponding to that portion of the magnetic strip 10 bearing the protrusions. In other words, the nonmagnetic annulus has circumferentially disposed therein a plurality of rod-shaped magnetic members similar to the protrusions required for the speed-signal forming means. The magnetic need not be limited to the form of a rod but may be in the form of a semicircle or a gear tooth. It is required only to dispose the magnetic members on the surface of the nonmagnetic annulus or to bury them in the latter in such a manner that the magnetic members are located at distances nearest to the end surface of the field magnet and are present in a number dependent upon the motor-speed signal involved.

Figure 7A:
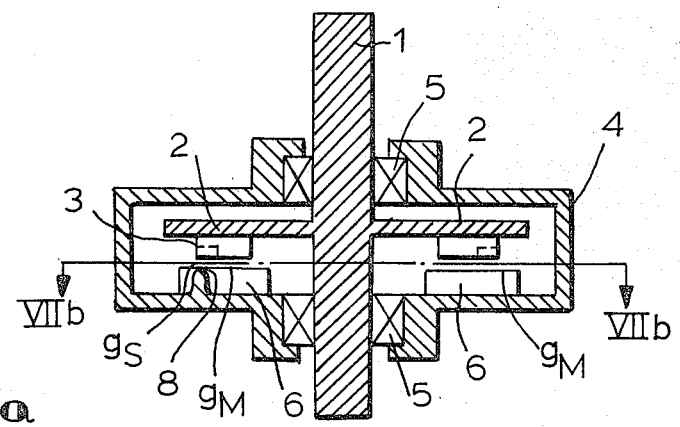
FIG. 7A is an axial sectional view of another modification of the present invention.
Figure 7B:
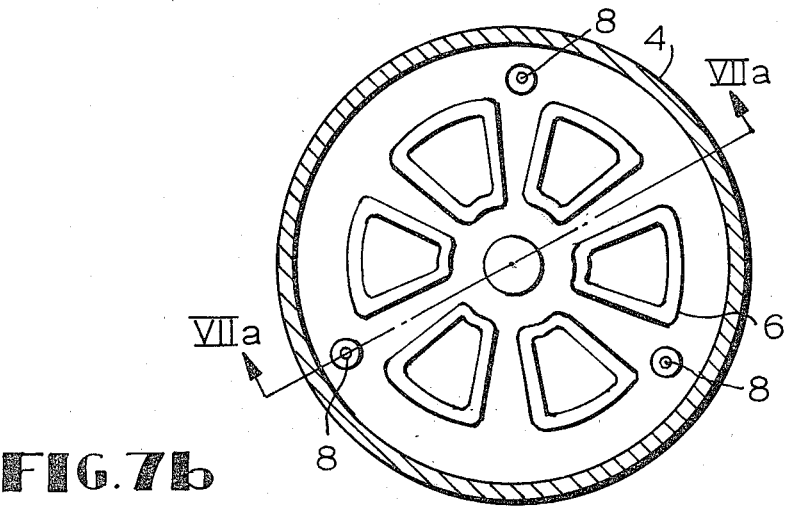
FIG. 7B is a radial sectional view of the arrangement shown in FIG. 7A as taken along the line VIIB—VIIB of FIG. 7A and viewed in the direction of the arrows in FIG. 7A.

The arrangement illustrated in FIG. 7 is different from that shown in FIG. 2 only in that in FIGS. 7A and 7B each of the magnetic sensor elements 8 is disposed on a cylindrical pedestal 11 in order to shorten the air gap through which the element faces that portion of the field magnet 3 provided with the slots 9.

In FIGS. 7A and 7B, therefore, like reference numerals designate the components identical or corresponding to those shown in FIGS. 2A, 2B and 2C.

In the arrangement of FIG. 7, the magnetic sensor element 8 has a higher sensitivity than that shown in FIG. 2C. Particularly the AC signals from which the speed signal is taken out have a high level.

In the arrangement of FIG. 2, the slots 9 are radially disposed in the surface of the field magnet 3 throughout the entire circumferential length in the manner as described above in conjunction with FIG. 2B. This is applicable to the arrangement shown in FIG. 6. By doing this, the signal delivered from each of the magnetic sensor elements is hardly changed but the field magnetic flux contributing to the drive of the motor varies in density in response to the slots or concave and convex portions. However, when the armature coils are disposed on the stator in plane relationship with the field magnet, those concave and convex portions hardly cause ripples of the resulting torque. Thus the torque is levelled.

FIG. 8 shows still another modification of the present invention but illustrates only the components required to form a magnetic path along which the magnetic flux flows to the associated magnetic sensor element.

Figure 8A:
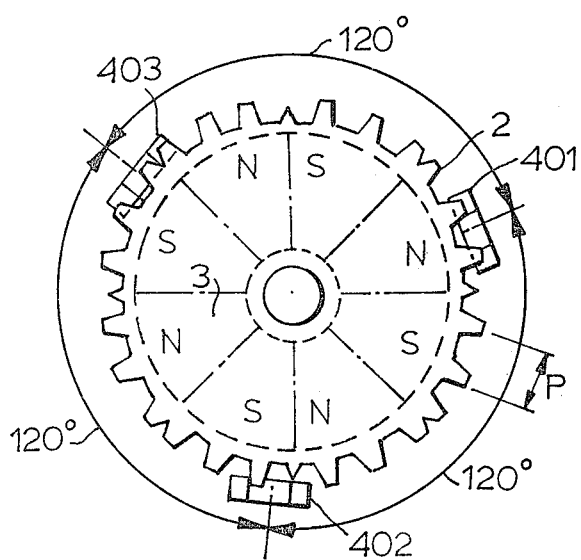
FIG. 8A is a plan view of one portion of still another modification of the present invention.

In the arrangement illustrated the outer periphery of the disc-shaped rotor 2 is toothed in a predetermined pattern. That is, the outer periphery has concave portions alternating with convex portions as shown in FIG. 8A to form the means for forming the speed signal. Also the field magnet 3 is magnetically charged to form an octuple pole structure as shown in FIG. 8A. The concave and convex portions disposed on the outer periphery of the rotor 2 are inverted in phase for each point of transition of one to the other of the magnetic poles. In other words, when the concave and convex portions are traced in one direction around the disc-shaped rotor 2, those convex portions located around each of the N pole sections correspond to those convex portions located around the adjacent S pole section. Also the convex portions are shown in FIG. 8A as having a pitch P which is smaller than the inter polar angular interval or pole pitch of the field magnet 3 as described above.

Figure 8B:
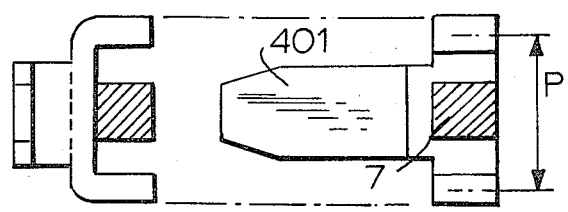
FIG. 8B is a side elevational view of the pedestal shown in FIG. 8A and associated components.
Figure 8C:
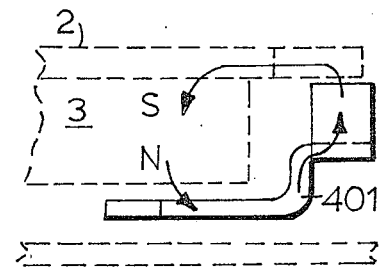
FIG. 8C is a diagram of a magnetic path formed in the arrangement shown in FIG. 8B.

As in the arrangement of FIG. 2, three magnetic sensor elements can be used to construct a three-phase synchronous motor. In this case, the three magnetic sensor elements 8 are disposed on respective pedestals 401, 402 and 403 located at equal angular intervals of 120 degrees as shown in FIG. 8A. The pedestals are identical to one another and the pedestal 401 is shown in FIG. 8B with the associated magnetic sensor element 8. The pedestal 401 is bent into a U-shape to surround the magnetic sensor element 8. The U-shaped pedestal 401 includes the end faces of both legs substantially flush with the surface of the surrounded magnetic sensor element 8 and spaced a distance equal to the pitch P of the convex portions on the rotor 2. As best shown in FIG. 8C, the pedestal 401 includes a tongue extending below the field magnet 3.

Assuming that the pedestal 401 is at its position illustrated by a rectangle 401 in FIG. 8A, a magnetic path is completed as shown by the arrows in FIG. 8C. More specifically, the magnetic path can be traced from the N pole of the field magnet 3 through the tongue of the pedestal 401, the U-shaped portion thereof holding the magnetic sensor element 8, that convex portion facing the U-shaped portion and then back to the S pole of the field magnet 3. Under these circumstances, the magnetic sensor element 8 has flowing therethrough a magnetic flux less in density than that flowing through the U-shaped portion of the pedestal 401. Then the rotor 2 is further rotated through an angle corresponding to one half the pitch P to cause one convex portion thereon to face the magnetic sensor element 8. At that time, the magnetic flux flowing through the magnetic sensor element 8 increases in density while that flowing through the U-shaped portion of the pedestal 401 decreases in density. The process as described above is repeated during the rotation of the rotor 2 whereby the magnetic sensor element 8 produces an output alternately increased and decreased in level. That is, the magnetic sensor element 8 produces an alternating current having a frequency proportional to the rotational speed of the rotor 2. This is true in the case of the remaining magnetic elements 8.

As described above, the convex and concave portions on the disc-shaped rotor 2 or the wave profile of the outer periphery thereof is inverted in phase each time one of the N and S poles changes to the other pole. Thus a signal for the rotational speed can easily be obtained merely by effecting an arithmetic addition of the outputs from the three magnetic sensor elements 8.

FIG. 9 shows, by way of example, a circuit for effecting the addition described above. Assuming that a Hall effect element is used as the magnetic sensor element 8, three Hall effect elements 71, 72 and 73 are connected in parallel circuit relationship across a positive and a negative terminal of a source of DC voltage through respective resistors and a common resistor as shown in FIG. 9. The Hall effect elements 71, 72 and 73 produce outputs of one polarity at one output terminal which are, in turn added to one another through resistors having the same magnitudes of resistance and also outputs of the opposite polarity at the other output terminals which are, in turn added to one another through separate resistors also equal in magnitude of resistance to one another. Therefore the Hall effect elements 71, 72 and 73 are arranged to produce the respective outputs differentially.

The sum of the outputs of one polarity is applied to an amplifier 74 along with the sum of the outputs of the opposite polarity. In the amplifier 74 the sums of the outputs are added to each other and amplified resulting in a signal indicating the rotational speed of the motor or rotor 2.

In FIG. 10, the output from the Hall effect elements 71, 72 and 73 are shown by waveforms of FIGS. 10a, 10b and 10c respectively, assuming that the fundamental component due to the disc-shaped rotor without the concave and convex portions, that is to say, the output from each of the Hall effect elements resulting from its sensing the magnetic flux density resulting only from the field magnet has a sinusoidal wave form and that the fundamental component has superposed thereon the output components by the same element caused from the concave and convex portion on the outer periphery of the rotor 2. It will readily be understood that the total number of those concave or convex portions be a multiple of three (3). In the arrangement of FIG. 8A, this total number is twenty-four (24).

By adding the signals having the waveforms, of FIGS. 10a, 10b and 10c to one another a waveform as shown in FIG. 10d results. The waveform of FIG. 10d depicts the output from the amplifier 74. In the addition as described above, the convex portions of the N poles serve to raise the output in the positive direction while the concave portions of the S poles serve also to raise the output in the positive direction. As a result, the addition of the waveforms of FIGS. 10a, 10b and 10c causes the removal of the fundamental component resulting from the field magnet to leave only the output components due to the concave and convex portions on the outer periphery of the rotor. In other words, there is produced a signal indicating the rotational speed of the motor or rotor 2.

While the circuit of FIG. 9 has been utilized to remove the fundamental component it is to be understood that the speed signal may be produced by applying the output fundamental component without the circuit of FIG. 9 used.

Also it will readily be understood that a position signal may be produced by determining the polarity of the output from each of the Hall effect elements.

From the foregoing it is seen that the arrangement of FIG. 8 can produce both the position and rotational speed signals from the magneto-motive force due to the field magnet.

Figure 11A:
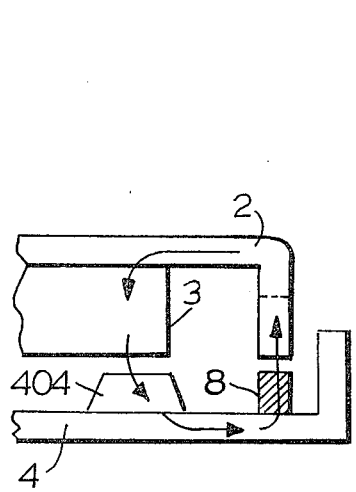
FIG. 11A is a schematic elevational view of one portion of a modification of the arrangement shown in FIGS. 8A, 8B and 8C.
Figure 11B:
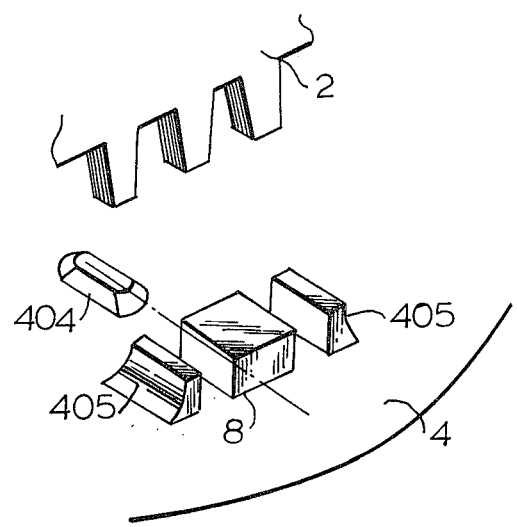
FIG. 11B is a perspective view of the arrangement shown in FIG. 11A with parts omitted.

The arrangement shown in FIGS. 8A, 8B and 8C can be modified as illustrated in FIGS. 11A and 11B. In the arrangement illustrated the outer peripheral portion of the disc-shaped rotor 2 is slotted and then bent perpendicularly to the disc and toward the stator 4 as best shown in FIG. 11A. In this way there is formed the equivalent to the concave and convex portions as shown in FIG. 8A.

Then each of the magnetic sensor elements is disposed on the stator 4 at a position where it successively comes directly below the slots or convex portions and the associated pedestal includes a tongue 404 and a pair of spaced protrusions 405 fixed to the stator 4 to form a unitary structure with the adjacent portions of the stator 4 while the magnetic sensor element 8 is between the protrusions 405 as best shown in FIG. 11B. The pair of protrusions 405 are equivalent to the legs of the "U" as shown in FIG. 8B.

Figure 12A:
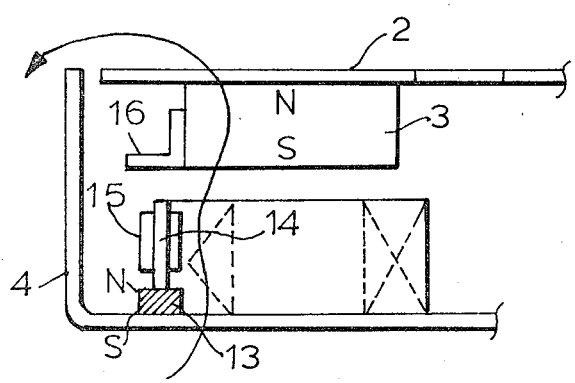
FIG. 12A is a side elevational view of a magnetic sensor element which may be used with the present invention.

As an example, the magnet sensor element 8 may be constructed in the form of a transformer as shown in FIG. 12A. In the arrangement illustrated, a permanent magnet 13 is disposed on the stator 4 at a position where it is below speed signal forming means as will be subsequently described. Then a magnetic core 14 in the form of a short rod extends from that end of the magnet 13 remote from the stator 4 and toward the rotor 2 coaxial with the magnet 4 and has an exciting winding 15 wound therearound. The permanent magnet 13 is magnetically charged so that the N and S poles are located adjacent to the magnetic core 14 and the stator 4 respectively. The components 13 through 15 form a magnetic sensor element. Pieces 16 are fixed at predetermined equal angular intervals to one portion of the circular field magnet 3 disposed on the rotor 2 by having one leg attached to the lateral surface thereof and the other leg substantially flush with that surface of the field magnet 3 facing the armature coils 6 also disposed on the stator 4. The other leg of the L-shaped pieces 16 extends radially outward so that during the rotation of the rotor 2 each of the magnetic sensor elements 13-14-15 will be below the L-shaped pieces 16 one after another with a narrow air gap formed therebetween. The L-shaped soft magnetic pieces 16 form the speed signal forming means.

Figure 12B:
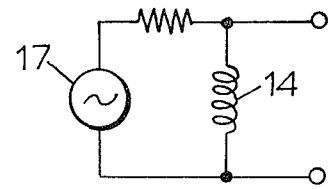
FIG. 12B is a circuit diagram of the winding portion shown in FIG. 12A.

As shown in FIG. 12B, an AC source 17 is connected across the exciting winding 15 through a resistor to supply to the windings 15 with a sinusoidal signal having a frequency of several tens of kilohertzs. This is true in the case of the remaining magnetic sensor elements. The permanent magnet 13 serves to bias the level of the magnetic flux flowing through the magnetic core 14 to a predetermined magnitude. The main magnetic path can be traced from the magnet 13 through the magnetic core 14, the L-shape magnetic piece 16, the field magnet 3, the stator 4 and thence to the magnet 13. The magnetic path includes an air gap formed between the field magnet 3 and the stator 4. This air gap remains unchanged at all positions of the rotating rotor 2 and therefore has a constant reluctance while the air gap formed between the magnetic pieces 16 and the magnetic cores 14 has a reluctance which varies during the rotation of the rotor 2. This is because during the rotation of the rotor 2 the presence and absence of the L-shaped magnetic pieces 16 above the magnetic core 14 alternates.

Therefore the magnetic sensor element shown in FIG. 12 can sense a variation in magnetic flux density.

From the foregoing it is seen that the present invention can not only produce a speed and a position signal for an associated electric motor but also permits the required number of magnetic sensor elements to be housed within the motor as a result of the provision of a sensing gap through the utilization of a magneto-motive force due to the field involved as a source of magneto-motive force. Accordingly, the present invention is advantageous in that electric motors including the rotation sensor device of the present invention are smalled-sized and simply constructed while the main motor body is prevented from having a large structure even though the rotation sensor device is disposed within the motor.

While the present invention has been illustrated and described in conjunction with a few preferred embodiments thereof it is to be understood that numerous changes and modifications may be resorted to without departing from the spirit and scope of the present invention.

What we claim is:

1. An electric motor comprising:
   a housing;
   at least one armature winding fixedly mounted on said housing;
   a rotor rotatably mounted in said housing;
   field magnet means fixedly mounted on said rotor and including a plurality of magnetic poles of alternating polarity disposed at predetermined angular intervals around said rotor, said field magnet means thereby producing magnetic flux the polarity of which alternates at said predetermined angular interval in the circumferential direction of said rotor;
   speed signal forming means fixedly mounted on said rotor along the circumference thereof for increasing and decreasing the density of said magnetic flux at a predetermined angular pitch which is smaller than said predetermined angular interval;
   magnetic flux sensor means fixedly mounted on said housing for detecting the magnetic flux density of the magnetic flux which is produced by said field magnetic means and varied by said speed signal forming means, and for producing a waveform signal corresponding to the waveform of the detected magnetic flux density, said waveform signal including a first component having a frequency which is proportional to the rotational speed of said rotor and inversely proportional to said predetermined angular interval, and a second component having a frequency which is proportional to the rotational speed of said rotor and inversely proportional to said predetermined angular pitch;
   speed sensor means connected to said magnetic flux sensor means and including means for separating said second frequency component from said waveform signal; and
   position sensor means connected to said magnetic flux sensor means for detecting the rotational position of said rotor from the first frequency component of said waveform signal.

2. An electric motor as claimed in claim 1, wherein said speed signal forming means comprises an annular surface of said rotor having defined therein a plurality of slots in the circumferential direction of said rotor, said annular surface opposing said magnetic flux sensor means.

3. An electric motor as claimed in claim 1, wherein said speed signal forming means comprises a ring of soft magnetic material fixedly secured to said rotor and concentric therewith, said ring having defined therein a plurality of slots in the circumferential direction of said ring.

4. An electric motor as claimed in claim 1, wherein said rotor is made of magnetic material, and said speed signal forming means comprises a plurality of projections extending from the circumference of said rotor at said predetermined pitch.

5. An electric motor as claimed in claim 4, wherein said projections extend radially outwardly from the circumference of said rotor.

6. An electric motor as claimed in claim 4, wherein said projections extend in the axial direction from the circumference of said rotor.

7. An electric motor as claimed in claim 1, wherein said magnetic flux sensor means comprises a plurality of magnetic sensor elements fixed to said housing and having surfaces opposing said speed signal forming means, said magnetic sensor elements being spaced from each other by a predetermined angle with respect to said rotor.

8. An electric motor as claimed in claim 7, wherein said magnetic sensor elements are Hall effect elements.

9. An electric motor as claimed in claim 1, wherein each of said magnetic sensor elements comprises a rod formed of magnetic material having an end surface opposing said speed signal forming means, an exciting winding wound around said rod, and a permanent magnet coupled to the other end of said rod and, magnetically biasing said rod to a predetermined magnetization.

10. An electric motor as claimed in claim 7, wherein said magnetic flux sensor means further comprises a plurality of magnetic path formers of magnetic material fixed to said housing, each of said magnetic path formers including:
- a first portion having a pair of legs having end surfaces flush with said surfaces of magnetic sensor elements and opposing said signal forming means, said pair of legs being spaced from each other by said predetermined angular pitch in the circumferential direction of said rotor, one of said magnetic sensor elements being disposed between said pair of legs;
- a second portion having a surface opposing said field magnet means; and
- a third portion magnetically coupling said first portion and said one of magnetic sensor elements disposed between said pair of legs to said second portion.

11. An electric motor as claimed in claim 10, wherein said first portion consists of a U-shaped piece of magnetic material the two legs of which form said pair of legs, said one of the magnetic sensor elements being disposed on the bight portion of said U-shaped piece, and said second and third portions consist of an extension extending from and integral with said bight portion of the U-shaped piece.

12. An electric motor as claimed in claim 10, wherein said housing is made of magnetic material, said legs and said second portion consist of projections integral with said housing, and said third portion consists of a portion of said housing connecting said projections.

* * * * *